US012750470B2

(12) United States Patent
Hung et al.

(10) Patent No.: US 12,750,470 B2
(45) Date of Patent: Sep. 29, 2026

(54) RENDERING FORMAT SELECTION BASED ON VIRTUAL DISTANCE

(71) Applicant: Hewlett-Packard Development Company, L.P., Spring, TX (US)

(72) Inventors: Ling I Hung, Taipei (TW); David Daley, Taipei (TW); Yow Wei Cheng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 190 days.

(21) Appl. No.: 18/249,190

(22) PCT Filed: Oct. 19, 2020

(86) PCT No.: PCT/US2020/056298
§ 371 (c)(1),
(2) Date: Apr. 14, 2023

(87) PCT Pub. No.: WO2022/086486
PCT Pub. Date: Apr. 28, 2022

(65) Prior Publication Data

US 2023/0412792 A1 Dec. 21, 2023

(51) Int. Cl.

| | |
|---|---|
| ***H04N 13/351*** | (2018.01) |
| ***G06T 17/00*** | (2006.01) |
| ***G06V 10/74*** | (2022.01) |
| ***H04N 13/344*** | (2018.01) |
| ***H04N 13/383*** | (2018.01) |

(52) U.S. Cl.
CPC ........... *H04N 13/351* (2018.05); *G06T 17/00* (2013.01); *G06V 10/761* (2022.01); *H04N 13/344* (2018.05); *H04N 13/383* (2018.05)

(58) Field of Classification Search
CPC .. H04N 13/351; H04N 13/383; H04N 13/344; G06V 10/761; G06T 17/00
See application file for complete search history.

(56) References Cited

U.S. PATENT DOCUMENTS

| | | | | |
|---|---|---|---|---|
| 6,088,006 A * | 7/2000 | Tabata | H04N 13/275 348/42 |
| 7,003,136 B1 * | 2/2006 | Harville | G06V 20/64 382/209 |
| 7,839,549 B2 * | 11/2010 | Mihajlovic | G02B 30/27 359/23 |
| 8,223,088 B1 * | 7/2012 | Gomez | G06F 3/03547 345/7 |
| 8,599,246 B2 * | 12/2013 | Oyagi | H04N 13/312 348/51 |
| 8,717,360 B2 * | 5/2014 | Vesely | G09G 3/003 345/419 |

(Continued)

*Primary Examiner* — Charles L Beard

(74) *Attorney, Agent, or Firm* — Quarles & Brady LLP

(57) ABSTRACT

In an example in accordance with the present disclosure, a system is described. The system includes a display device to display a digital scene. The system also includes a processor to determine, for a user, a maximum distance at which a difference between a left eye image and a right eye image are distinguishable. The system also includes a rendering engine to select a rendering format for different portions of the digital scene based on a comparison of virtual distances of the portions compared to the maximum distance.

18 Claims, 7 Drawing Sheets

(56) References Cited

U.S. PATENT DOCUMENTS

| | | | | |
|---|---|---|---|---|
| 8,952,958 | B1 * | 2/2015 | Low | H04N 13/296 345/474 |
| 9,167,226 | B2 * | 10/2015 | Klein Gunnewiek | H04N 13/111 |
| 9,313,481 | B2 * | 4/2016 | Sylvan | G02B 27/0172 |
| 9,565,415 | B2 * | 2/2017 | Zhang | H04N 13/122 |
| 9,600,888 | B2 * | 3/2017 | Kawai | G06T 15/20 |
| 9,674,501 | B2 * | 6/2017 | Jang | H04N 13/128 |
| 10,241,329 | B2 * | 3/2019 | Perreault | G02B 27/0093 |
| 10,268,290 | B2 * | 4/2019 | Trail | A61B 3/113 |
| 10,326,977 | B1 * | 6/2019 | Mercier | G01S 3/00 |
| 10,469,833 | B2 * | 11/2019 | Hua | G06T 19/006 |
| 10,509,466 | B1 * | 12/2019 | Miller | H04N 23/57 |
| 10,616,567 | B1 * | 4/2020 | Clemens | G06T 15/20 |
| 10,666,921 | B2 | 5/2020 | Christensen et al. | |
| 10,819,973 | B2 * | 10/2020 | French | G06T 15/08 |
| 10,852,820 | B1 * | 12/2020 | Golard | G06F 3/013 |
| 10,871,627 | B1 * | 12/2020 | Fang | G02B 27/0093 |
| 10,935,788 | B2 * | 3/2021 | Neill | G02B 27/017 |
| 10,979,685 | B1 * | 4/2021 | Silverstein | H04N 13/117 |
| 10,989,927 | B2 * | 4/2021 | Lanman | G02B 27/0093 |
| 11,054,650 | B2 * | 7/2021 | Fujimaki | G02B 27/017 |
| 11,057,612 | B1 * | 7/2021 | Clemens | H04N 13/275 |
| 11,145,113 | B1 * | 10/2021 | Mayers | H04N 13/279 |
| 11,153,555 | B1 * | 10/2021 | Healy | A61B 34/20 |
| 11,164,375 | B1 * | 11/2021 | Grover | G02B 30/26 |
| 11,375,179 | B1 * | 6/2022 | Clemens | H04N 13/221 |
| 11,536,973 | B2 * | 12/2022 | Miller | G06F 3/0346 |
| 11,662,808 | B2 * | 5/2023 | Taylor | G06F 3/012 345/419 |
| 11,710,280 | B1 * | 7/2023 | Durairaj | G06V 40/28 345/419 |
| 11,818,325 | B2 * | 11/2023 | Taylor | H04N 13/128 |
| 11,924,536 | B2 * | 3/2024 | Lee | G02B 27/0093 |
| 2003/0197933 | A1 * | 10/2003 | Sudo | H04N 13/31 359/464 |
| 2004/0066555 | A1 * | 4/2004 | Nomura | H04N 13/275 359/462 |
| 2004/0189796 | A1 * | 9/2004 | Ho | H04N 13/261 348/42 |
| 2005/0219239 | A1 * | 10/2005 | Mashitani | H04N 13/275 348/E13.067 |
| 2005/0253924 | A1 * | 11/2005 | Mashitani | H04N 13/275 348/42 |
| 2006/0232665 | A1 * | 10/2006 | Schowengerdt | H04N 13/144 348/E13.067 |
| 2007/0047040 | A1 * | 3/2007 | Ha | H04N 13/144 348/E13.067 |
| 2008/0117289 | A1 * | 5/2008 | Schowengerdt | G02B 26/005 348/E13.032 |
| 2009/0160934 | A1 * | 6/2009 | Hendrickson | G03B 35/08 348/47 |
| 2009/0219283 | A1 * | 9/2009 | Hendrickson | H04N 13/128 345/473 |
| 2009/0244262 | A1 * | 10/2009 | Masuda | H04N 13/183 348/46 |
| 2010/0066820 | A1 * | 3/2010 | Park | G09G 3/342 348/E13.001 |
| 2010/0085351 | A1 * | 4/2010 | Deb | G06T 19/00 345/428 |
| 2010/0118127 | A1 * | 5/2010 | Nam | H04N 13/122 348/51 |
| 2010/0142924 | A1 * | 6/2010 | Yamashita | G11B 27/10 348/42 |
| 2010/0215343 | A1 * | 8/2010 | Ikeda | H04N 9/7921 348/54 |
| 2010/0245666 | A1 * | 9/2010 | Rosen | G03B 21/26 348/51 |
| 2010/0309297 | A1 * | 12/2010 | Nakagawa | H04N 13/341 348/56 |
| 2010/0328428 | A1 * | 12/2010 | Booth, Jr. | G06T 15/30 348/46 |
| 2011/0075257 | A1 * | 3/2011 | Hua | G02B 27/0172 359/464 |
| 2011/0090215 | A1 * | 4/2011 | Ohta | H04N 13/275 345/419 |
| 2011/0126160 | A1 * | 5/2011 | Han | H04N 13/139 715/848 |
| 2011/0157155 | A1 * | 6/2011 | Turner | H04N 13/261 345/619 |
| 2011/0157555 | A1 * | 6/2011 | Mashitani | G03B 35/16 353/7 |
| 2011/0187705 | A1 * | 8/2011 | Lan | G09G 3/003 345/419 |
| 2011/0211045 | A1 * | 9/2011 | Bollano | H04N 13/128 348/46 |
| 2011/0249958 | A1 * | 10/2011 | Fujita | H04N 13/106 386/E5.028 |
| 2011/0273437 | A1 * | 11/2011 | Sanderson | H04N 13/398 345/419 |
| 2011/0304618 | A1 * | 12/2011 | Chen | H04N 13/128 345/420 |
| 2012/0032949 | A1 * | 2/2012 | Lim | G09G 3/003 345/419 |
| 2012/0038743 | A1 * | 2/2012 | Su | H04N 13/144 348/E13.064 |
| 2012/0056990 | A1 * | 3/2012 | Yoshie | H04N 13/189 348/46 |
| 2012/0084652 | A1 * | 4/2012 | Martinez Bauza | H04N 13/128 348/E13.001 |
| 2012/0133642 | A1 * | 5/2012 | Umezu | G03B 35/16 345/419 |
| 2012/0154517 | A1 * | 6/2012 | Um | H04N 13/20 348/E13.074 |
| 2012/0162383 | A1 * | 6/2012 | Kushida | H04N 5/208 348/47 |
| 2012/0188235 | A1 * | 7/2012 | Wu | G06T 7/50 345/419 |
| 2012/0194660 | A1 * | 8/2012 | Nakamura | H04N 13/341 348/54 |
| 2012/0242655 | A1 * | 9/2012 | Ogata | H04N 13/128 345/419 |
| 2012/0249529 | A1 * | 10/2012 | Matsumoto | H04N 13/128 345/419 |
| 2012/0249534 | A1 * | 10/2012 | Kanagawa | A61B 6/022 345/419 |
| 2012/0262451 | A1 * | 10/2012 | Kotani | H04N 13/341 359/466 |
| 2012/0287235 | A1 * | 11/2012 | Ahn | H04N 13/398 348/43 |
| 2012/0307016 | A1 * | 12/2012 | Uenaka | H04N 13/289 348/47 |
| 2012/0314933 | A1 * | 12/2012 | Morifuji | G06T 5/70 382/154 |
| 2013/0038606 | A1 * | 2/2013 | Ushiki | H04N 13/351 348/46 |
| 2013/0050439 | A1 * | 2/2013 | Nakamura | H04N 13/30 348/E13.008 |
| 2013/0057644 | A1 * | 3/2013 | Stefanoski | H04N 13/111 348/42 |
| 2013/0063576 | A1 * | 3/2013 | Okubo | G02B 30/33 348/51 |
| 2013/0063817 | A1 * | 3/2013 | Santori | G02B 30/52 359/466 |
| 2013/0076618 | A1 * | 3/2013 | Miyamoto | G02B 30/00 345/156 |
| 2013/0076742 | A1 * | 3/2013 | Itani | H04N 13/156 345/419 |
| 2013/0093859 | A1 * | 4/2013 | Nakamura | H04N 9/8227 348/51 |
| 2013/0106841 | A1 * | 5/2013 | Ko | H04N 13/128 345/419 |
| 2013/0107014 | A1 * | 5/2013 | Masuda | H04N 13/239 348/47 |
| 2013/0127608 | A1 * | 5/2013 | Ishikawa | B60K 35/211 340/425.5 |
| 2013/0135449 | A1 * | 5/2013 | Horii | H04N 13/128 348/49 |

(56) References Cited

U.S. PATENT DOCUMENTS

| | | | | |
|---|---|---|---|---|
| 2013/0163855 | A1* | 6/2013 | Mathur | H04N 13/106 382/154 |
| 2013/0169633 | A1* | 7/2013 | Hattori | H04N 13/128 345/419 |
| 2013/0182078 | A1* | 7/2013 | Kitaura | H04N 13/239 348/46 |
| 2013/0194663 | A1* | 8/2013 | Saigo | H04N 13/341 359/464 |
| 2013/0222557 | A1* | 8/2013 | Kuo | G02B 30/33 348/54 |
| 2014/0035902 | A1* | 2/2014 | An | H04N 13/144 382/164 |
| 2014/0063208 | A1* | 3/2014 | Fukasawa | A61B 5/742 348/51 |
| 2014/0085433 | A1* | 3/2014 | Han | H04N 13/351 348/42 |
| 2014/0139644 | A1* | 5/2014 | Ueda | H04N 13/218 348/49 |
| 2014/0146137 | A1* | 5/2014 | Yea | H04N 19/105 348/43 |
| 2014/0176685 | A1* | 6/2014 | Oikawa | A61B 6/022 348/51 |
| 2014/0198847 | A1* | 7/2014 | Takahashi | H04N 19/597 375/240.12 |
| 2014/0218357 | A1* | 8/2014 | Akao | G06T 15/205 345/419 |
| 2014/0218472 | A1* | 8/2014 | Kim | H04N 13/376 348/43 |
| 2014/0225887 | A1* | 8/2014 | Aguirre-Valencia | H04N 13/279 345/419 |
| 2014/0247327 | A1* | 9/2014 | Masuda | H04N 13/204 348/46 |
| 2014/0269898 | A1* | 9/2014 | Thirumalai | H04N 13/161 375/240.02 |
| 2014/0307925 | A1* | 10/2014 | Uemori | G01B 11/14 382/106 |
| 2014/0320614 | A1 | 10/2014 | Gaudreau | |
| 2014/0341285 | A1* | 11/2014 | Sakurai | H04N 13/161 375/240.12 |
| 2014/0347444 | A1* | 11/2014 | Naske | H04N 13/271 348/46 |
| 2014/0375772 | A1* | 12/2014 | Gabara | H04N 23/661 348/47 |
| 2015/0009294 | A1* | 1/2015 | Izawa | H04N 13/261 348/46 |
| 2015/0042753 | A1* | 2/2015 | Hattori | H04N 19/597 348/43 |
| 2015/0130793 | A1* | 5/2015 | Han | H04N 13/128 345/419 |
| 2015/0179218 | A1* | 6/2015 | Nadler | H04N 13/363 382/154 |
| 2015/0288944 | A1* | 10/2015 | Nistico | G06F 3/0487 345/156 |
| 2015/0341622 | A1* | 11/2015 | Song | H04N 13/156 348/51 |
| 2015/0373318 | A1* | 12/2015 | Li | G06T 7/593 348/50 |
| 2016/0044305 | A1* | 2/2016 | Kim | H04N 13/351 348/54 |
| 2016/0080718 | A1* | 3/2016 | Wu | G06T 7/11 348/47 |
| 2016/0086385 | A1* | 3/2016 | Gourlay | G06T 19/20 382/154 |
| 2016/0261841 | A1* | 9/2016 | Mathew | H04N 13/344 |
| 2016/0269717 | A1* | 9/2016 | Kato | H04N 13/243 |
| 2016/0320863 | A1* | 11/2016 | Shimoda | G06F 3/0304 |
| 2016/0360187 | A1* | 12/2016 | Smithwick | G02B 30/27 |
| 2017/0061702 | A1* | 3/2017 | Christen | G02B 27/017 |
| 2017/0078652 | A1* | 3/2017 | Hua | G06V 20/20 |
| 2017/0085867 | A1* | 3/2017 | Baran | B41M 3/008 |
| 2017/0094266 | A1* | 3/2017 | Han | H04N 13/324 |
| 2017/0111633 | A1* | 4/2017 | Kang | H04N 13/317 |
| 2017/0148215 | A1* | 5/2017 | Aksoy | G02B 27/017 |
| 2017/0160518 | A1* | 6/2017 | Lanman | G02B 27/0093 |
| 2017/0160798 | A1* | 6/2017 | Lanman | G02B 27/0093 |
| 2017/0171538 | A1* | 6/2017 | Bell | G06T 19/006 |
| 2017/0180721 | A1* | 6/2017 | Parker | H04N 13/383 |
| 2017/0262054 | A1* | 9/2017 | Lanman | G02B 27/0172 |
| 2017/0295353 | A1* | 10/2017 | Hwang | G06T 3/00 |
| 2017/0309057 | A1* | 10/2017 | Vaganov | G06F 3/04815 |
| 2017/0372516 | A1* | 12/2017 | Evans | G02B 27/017 |
| 2018/0025533 | A1* | 1/2018 | Sato | H04N 13/327 345/625 |
| 2018/0039425 | A1 | 2/2018 | Li | |
| 2018/0091800 | A1* | 3/2018 | Ratcliff | H04N 13/305 |
| 2018/0096533 | A1* | 4/2018 | Osman | G06T 17/10 |
| 2018/0108161 | A1* | 4/2018 | Mok | H04N 13/128 |
| 2018/0164588 | A1* | 6/2018 | Leppanen | G06F 3/048 |
| 2018/0250589 | A1* | 9/2018 | Cossairt | A63G 7/00 |
| 2018/0262758 | A1* | 9/2018 | El-Ghoroury | G02B 27/017 |
| 2018/0284885 | A1* | 10/2018 | Kim | G06F 3/013 |
| 2018/0316908 | A1* | 11/2018 | Chernobieff | H04N 13/275 |
| 2018/0330515 | A1* | 11/2018 | Stall | G06T 19/003 |
| 2019/0079302 | A1* | 3/2019 | Ninan | G06F 3/011 |
| 2019/0110038 | A1* | 4/2019 | DiVerdi | G02B 27/0172 |
| 2019/0149811 | A1* | 5/2019 | Yano | G06T 19/00 348/53 |
| 2019/0162950 | A1* | 5/2019 | Lapstun | H04N 13/243 |
| 2019/0167095 | A1 | 6/2019 | Krueger | |
| 2019/0192251 | A1* | 6/2019 | Kado | G02B 21/22 |
| 2019/0222823 | A1* | 7/2019 | Clagg | G06T 5/50 |
| 2019/0349575 | A1* | 11/2019 | Knepper | G06F 3/012 |
| 2020/0019763 | A1* | 1/2020 | Iyer | G06F 18/22 |
| 2020/0107005 | A1* | 4/2020 | Katz | H04N 13/122 |
| 2020/0186787 | A1* | 6/2020 | Cantero Clares | H04N 13/106 |
| 2020/0304776 | A1* | 9/2020 | Ratcliff | H04N 13/366 |
| 2020/0312011 | A1* | 10/2020 | Kopeinigg | G06T 19/006 |
| 2020/0322595 | A1* | 10/2020 | Abe | H04N 13/383 |
| 2020/0326543 | A1* | 10/2020 | Kim | G06V 40/19 |
| 2020/0374504 | A1* | 11/2020 | Taylor | H04N 13/156 |
| 2021/0042954 | A1* | 2/2021 | Guo | G06V 10/806 |
| 2021/0097763 | A1* | 4/2021 | Luo | G06T 19/006 |
| 2021/0174472 | A1* | 6/2021 | Taylor | G06F 3/013 |
| 2021/0183343 | A1* | 6/2021 | Beith | G02B 27/0172 |
| 2021/0195158 | A1* | 6/2021 | Kang | H04N 13/385 |
| 2021/0358084 | A1* | 11/2021 | Bleyer | G02B 27/0093 |
| 2021/0373340 | A1* | 12/2021 | DeVine | G02B 27/0172 |
| 2022/0067967 | A1* | 3/2022 | Luo | G06V 40/168 |
| 2022/0099972 | A1* | 3/2022 | Birklbauer | H04N 13/279 |
| 2022/0103748 | A1* | 3/2022 | Canberk | G06V 40/107 |
| 2022/0109816 | A1* | 4/2022 | Ray | G06T 17/00 |
| 2022/0148254 | A1* | 5/2022 | Sorkine Hornung | H04N 13/117 |
| 2022/0230398 | A1* | 7/2022 | Peri | G06T 19/006 |
| 2022/0394234 | A1* | 12/2022 | Etigson | G02B 30/10 |
| 2023/0009683 | A1* | 1/2023 | Biran | G06T 19/006 |
| 2023/0252722 | A1* | 8/2023 | Nakamura | G06T 17/00 345/419 |
| 2023/0298250 | A1* | 9/2023 | Luo | H04N 13/128 345/582 |
| 2023/0324686 | A1* | 10/2023 | Sharma | G02B 27/0172 345/633 |
| 2023/0396752 | A1* | 12/2023 | Jansen dos Reis | G06F 3/011 |
| 2023/0410419 | A1* | 12/2023 | Baney | G06T 17/00 |
| 2023/0412792 | A1* | 12/2023 | Hung | H04N 13/351 |
| 2024/0040099 | A1* | 2/2024 | Da Veiga | H04N 13/122 |
| 2024/0062483 | A1* | 2/2024 | Xiong | G06V 20/64 |
| 2024/0129451 | A1* | 4/2024 | Healy | A61B 34/20 |
| 2024/0135644 | A1* | 4/2024 | Strandborg | G06T 17/00 |
| 2024/0203078 | A1* | 6/2024 | Hajmohammadi | G06T 17/20 |
| 2024/0223742 | A1* | 7/2024 | Xiong | H04N 13/128 |
| 2024/0282050 | A1* | 8/2024 | Strandborg | G06T 7/90 |
| 2024/0320934 | A1* | 9/2024 | Ogata | G06T 19/006 |
| 2024/0414492 | A1* | 12/2024 | Hertensteiner | G10L 21/0208 |
| 2024/0428527 | A1* | 12/2024 | Hajas | G06T 19/006 |
| 2025/0104183 | A1* | 3/2025 | Miller | G06T 3/18 |
| 2025/0200771 | A1* | 6/2025 | Jeong | G06T 7/50 |

* cited by examiner

RENDERING FORMAT SELECTION BASED ON VIRTUAL DISTANCE

BACKGROUND

Extended reality systems allow a user to become immersed in an extended reality environment wherein the user can interact with the extended environment. For example, a head-mounted display, using stereoscopic display devices, allows a user to see, and become immersed in, any desired virtual scene. Such extended reality applications can provide visual stimuli, auditory stimuli, and/or can track user movement to create a rich immersive experience.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
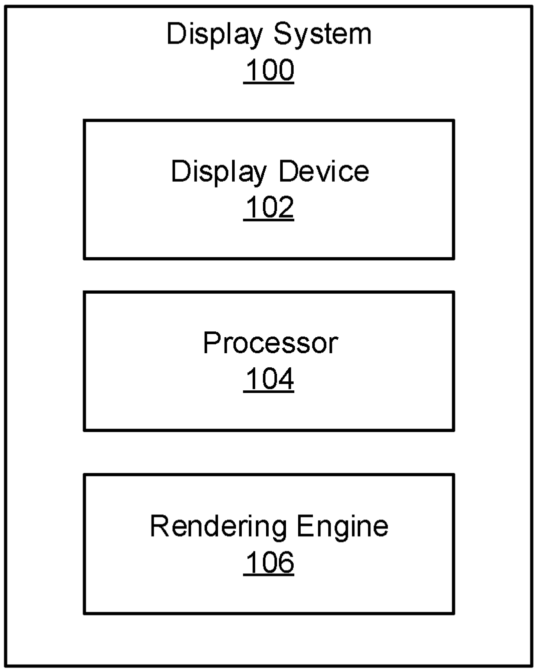
FIG. 1 is a block diagram of a system for selecting a rendering format based on content virtual distance, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Extended reality (XR) systems allow a user to become immersed in an extended reality environment wherein they can interact with the extended environment. XR systems include virtual reality (VR) systems, augmented reality (AR) systems, and mixed reality (MR) systems. Such XR systems can include extended reality headsets to generate realistic images, sounds, and other human discernable sensations that simulate a user's physical presence in a virtual environment presented at the headset. A VR system includes physical spaces and/or multi-projected environments. AR systems may include systems and devices that implement direct and/or indirect displays of a physical, real-world environment whose elements are augmented by computer-generated sensory input such as sound, video, graphics and/or GPS data. MR systems merge real and virtual worlds to produce new environments and visualizations where physical and digital objects co-exist and interact in real time. For simplicity, VR systems, AR systems, and MR systems are referred to herein as XR systems.

While XR systems have undoubtedly generated a new and exciting field of information presentation and have greatly expanded the opportunities and capabilities for information display, some developments may further enhance their use and implementation in a variety of industries.

For example, some XR systems perform stereoscopic rendering which provides depth to flat images. That is, humans view the world through two eyes, each eye seeing the same content, but at slightly different angles. This effect is on display when looking at an object in front of a user's face. When looking at the object with just one eye and then looking at the same object with the other eye, the object appears to move. Human brains combine the information collected by each eye to form the view of the world we see wherein the scene has depth. A stereoscopic XR system recreates this operation of the brain by rendering a scene twice, once from the perspective of the user's left eye and once from the perspective of the user's right eye. The two images are similar but from slightly different angles. The XR system then presents these images to respective eyes, (i.e., right eye image to the right eye and left eye image to the left eye) to give a sense of depth to the flat images. That is, a stereoscopic rendering includes generating a left eye image and a right eye image and presents each image to the respective eye.

While stereoscopic rendering provides an enhanced and visually immersive experience for a user, it may consume more processing bandwidth and may consume more time which may result in lags and disruptions in the presentation of the digital scene. For example, a rendering engine of the XR system is to provide an image/video on a display device based on a description of the content. There are any number of operations that are carried out in generating the image or 3D scene from the content including vertex processing, rasterizing, fragment processing, and output merging. In rendering a 3D digital scene, this may include the processing of large amounts of data. When generating a stereoscopic rendering, each step is carried out two times, one for the left eye angle and one for the right eye angle. Processing this quantity of data may overwhelm a rendering engine such that the rendering engine may not be able to keep up and lags and jolts in the digital scene may result. This may be particularly noticeable in high resolution head-mounted displays where large amounts of data are processed to render a life-like environment.

Even if stereoscopic rendering as described above does not overwhelm a rendering engine, reducing the workload of the rendering engine may allow for more efficient and less costly processors to be used in the future, may decrease power consumption, and may increase the use of stereoscopic imaging not only in XR environments but other display environments.

Accordingly, the present specification describes systems, methods, and non-transitory machine-readable storage medium to increase efficiency and performance by selective stereoscopic rendering based on a virtual distance of content of the digital scene and in some cases based on where in the digital scene the user is looking. The content may be separated into 1) "far world" content, referring to those portions of the digital scene that have a virtual distance greater than a maximum distance that a user can distinguish between a left eye image and a right eye image and 2) "near world" content, referring to those portions of the digital scene that have a virtual distance that is less than the maximum distance. With the digital scene apportioned into separate near and far world content, the rendering engine may perform near world and far world rendering separately. Specifically, the rendering engine may skip stereoscopic rendering of the far world content when the user is looking at something in the near world. As a result, the cost of calculating whole scene stereo images for both eyes is saved.

Accordingly, the present specification describes performing selective stereoscopic rendering based on the user's eye gaze location to save computation power. Specifically, the present specification describes how eye rotation angle determines stereo visualization and how a maximum perceivable distance of stereo experiences for a user is determined. The system then uses different formats for selective stereoscopic rendering.

Accordingly, instead of rendering the entire scene stereoscopically, the present systems and methods selectively render the far world content stereoscopically a portion of the time. More particularly, selective stereoscopic rendering of the far world content may be reserved for when the user gazes at far world objects and stereoscopic rendering of the far world content is skipped when the user is looking at near world objects.

Specifically, the present specification describes a display system that includes a display device to display a digital scene. The display system also includes a processor. The processor determines, for a user, a maximum distance at which a difference between a left eye image and a right eye image are distinguishable. The display system also includes a rendering engine to select a rendering format for different portions of the digital scene based on a comparison of virtual distance of the portions compared to the maximum distance.

The present specification also describes a method. According to the method, the processor determines, for a user, a maximum distance at which a left eye image and a right eye image are distinguishable. A gaze tracking system determines when the user is looking at a location in a digital scene that has a virtual distance greater than the maximum distance. Responsive to a determination that the user is looking at a location in the digital scene that has a virtual distance greater than the maximum distance, a rendering engine renders portions of the digital scene that have a virtual distance greater than the maximum distance in a first format. Responsive to a determination that the user is looking at a location in the digital scene that has a virtual distance less than the maximum distance, the rendering engine renders portions of the digital scene that have a virtual distance greater than the maximum distance in a second format.

The present specification also describes a non-transitory machine-readable storage medium encoded with instructions executable by a processor. The machine-readable storage medium includes instructions to determine, for a user, a maximum distance at which a left eye image and a right eye image are distinguishable and determine when the user is looking at a location in a digital scene that has a virtual distance greater than the maximum distance. The machine-readable storage medium also includes instructions to render portions of the digital scene that have a virtual distance less than the maximum distance stereoscopically. The machine-readable storage medium also includes instructions to, responsive to a determination that the user is looking at a location in the digital scene that has a virtual distance greater than the maximum distance, render portions of the digital scene that have a virtual distance greater than the maximum distance stereoscopically. The machine-readable storage medium also includes instructions to, responsive to a determination that the user is looking at a location in the digital scene that has a virtual distance less than the maximum distance, render portions of the digital scene that have a virtual distance greater than the maximum distance as a single eye image.

In summary, using such a system, method, and machine-readable storage medium may, for example, 1) reduce a workload on a rendering engine of a display system; 2) increase the rendering rate; 3) reduce a processing bandwidth; 4) provide a customized rendering based on user specific and display specific information; and 5) maintain the quality of the rendered digital scene. However, it is contemplated that the devices disclosed herein may address other matters and deficiencies in a number of technical areas, for example.

As used in the present specification and in the appended claims the term "maximum distance" refers to the greatest distance at which a user can perceive a difference between a right eye image and a left eye image.

Accordingly, as used in the present specification and in the appended claims, the term "far world" refers to those portions of a digital scene with a virtual distance that is greater than the maximum distance.

Further, as used in the present specification and in the appended claims, the term "near world" refers to those portions of a digital scene with a virtual distance that is less than the maximum distance.

Even further, as used in the present specification and in the appended claims, the term "a number of" or similar language is meant to be understood broadly as any positive number including 1 to infinity.

FIG. 1 is a block diagram of a display system (100) for selecting a rendering format based on content virtual distance, according to an example of the principles described herein.

Figure 2:
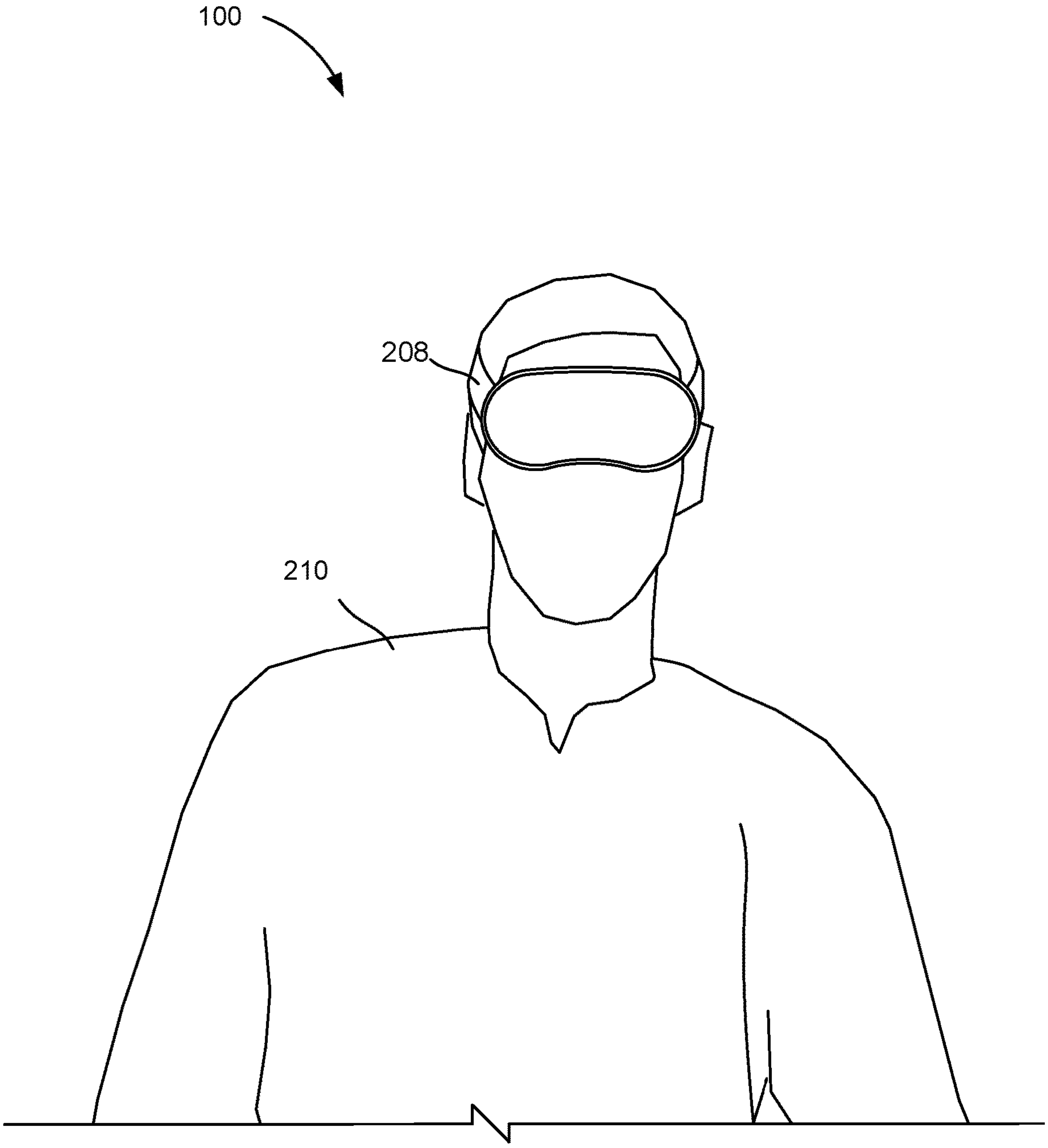
FIG. 2 is a diagram of an extended reality system for selecting a rendering format based on content virtual distance, according to an example of the principles described herein.

The display system (100) includes a display device (102) to display the digital scene. The display device (102) may be of a variety of types. For example, the display device (102) may be an extended reality headset to be worn on a head of the user. An extended reality headset (102) covers the eyes of the user and presents the visual information in an enclosed environment formed by the extended reality headset (102) housing and the user's face. An example of such an extended reality headset (102) is depicted in FIG. 2 below. As described above, the term extended reality (XR) encompasses, VR, MR, and AR such that an extended reality headset encompasses VR headsets, MR headsets, and AR headsets. While particular reference is made to an XR headset, the display system (100) may include other types of display devices (102) such as liquid crystal displays (LCDs), light emitting diode (LED) screens, and plasma screens. These screens may be implemented in any number of electronic devices such as computers, laptops, tablets, mobile phones, etc. Accordingly, while the present specification may describe the display system (100) as including a head-mounted XR headset, the display system (100) may include any display device (102) which uses stereo vision to construct an extended reality environment.

In some examples, the display device (102) is stereoscopic, meaning that it presents content that has been rendered stereoscopically. However, the present display system (100) may be implemented in non-stereoscopic display devices as well. In this example certain content is rendered in a first format and other content is rendered in a different format.

The display system (100) includes a processor (104) to determine, for a user, a maximum distance at which a difference between a left eye image and a right eye image are distinguishable. That is, as described above, each eye views a scene differently. The content of the scene may be the same, but a viewing angle may be different. This effect is reduced the farther away the content is. There exists some maximum distance at which the effect is no longer perceptible. In the present specification, this distance is referred to as the maximum distance. This maximum distance may be user specific and display specific. That is, the maximum distance is based on certain characteristics of the display device (102) and physical characteristics of the user. The processor (104) determines this maximum distance based on these display device (102) characteristics and user physical characteristics.

First, the maximum distance may be based on an inter-pupillary distance and the processor (104) may determine the inter-pupillary distance. Inter-pupillary distance (IPD) refers to the distance between the center of a user's eyes and impacts at what distance a user can perceive differences between a left eye image and a right eye image. Differences in IPD affects the angle of the eyes when looking at an object and therefore change the calculation of the maximum distance as presented below.

The processor (104) may determine the IPD in a variety of ways. That is, as described above, each user may have a different inter-pupillary distance which may result in different users viewing the XR environment differently. Accordingly, the XR display may be calibrated based on a user's inter-pupillary distance. In one particular example, the display device (102), such as an extended reality headset, may include a slider or other control toggle by which a user manually calibrates the XR display to their particular IPD. Note that in this example, a user does not need to know their IPD, but rather can adjust the slider or toggle until the digital scene is clear and sharp. The processor (104) may determine the IPD settings that resulted in the digital scene being clear and sharp and may use this setting in determining the IPD and maximum distance. That is, the processor (104) may read the IPD value associated with the user's adjustment.

In another example, the processor (104) may determine the IPD based on information collected from a gaze tracking system. That is, the display device (102) may include a gaze tracking system which can identify the pupils of the eyes and may therefore determine a distance between each eye. Via this eye-tracking operation, the IPD may be passed to the processor (104) and a maximum distance based thereon.

The maximum distance may also be based on device characteristics, specifically the field of view and the resolution of the display device (102). Accordingly, the processor (104) may extract from the display system (100), information relating to the field of view and resolution of the display device (102) and may calculate the maximum distance for a particular user on a particular display device (102).

In general, depth perception is based on the convergence angle of the eyes. At 90 degrees, both eyes are facing directly forward and focused at an infinite distance. At 45 degree inward, the eyes are looking across one another. Along with the eye angle, the resolution of the display device (102) implies that each pixel may be associated with a view angle to the user. As one particular example, assume a display device (102) has a horizontal resolution of 1920 pixels, which is 960-pixel per eye, and a horizontal field of view about 90 degrees per eye. Dividing the field of view by the resolution indicates that each pixel represents about 0.1 degree of rotation for the eye. Each of these incremental degrees of rotation is associated with a distance. Using the angle of rotation, θ, and half of the IPD, the distance to the object can be calculated using the below equations.

$$\theta\left(\frac{\text{Eye to Rotate}}{\text{pixel}}\right) = \frac{FOV}{R}$$

$$\tan\theta = \frac{D_{max}}{0.5IPD}$$

$$D_{max} = \tan\theta \times 0.5IPD$$

In these equations, FOV refers to the field of view of the display device (102), R is the resolution of the display device (102), and IPD is the inter-pupillary distance. Combining these equations, the maximum distance that a left eye image and a right eye image are distinguishable for a user may be determined by the following equation.

$$D_{max} = \tan\left(\frac{FOV}{0.5R}\right) \times \left(\frac{IPD}{2}\right)$$

A particular numeric example is now provided. Using the above equation, given a head-mounted extended reality display device (102) with a horizontal resolution, R, of 1920 pixels and a horizontal field of view, FOV, of 90 degrees, and a user with an inter-pupillary distance, IPD, of 63 millimeters, the maximum distance, Dmax, may be 51.54 meters. That means, any portions of the digital scene that have virtual distances greater than 51.54 meters have no perceptible distinction between a left eye image and a right eye image for this particular user. As such, it is this content which may be rendered for a single eye as opposed to a stereoscopic rendering.

The display system (100) also includes a rendering engine (106) to select a rendering format for different portions of the digital scene based on a comparison of a virtual distance of the portions of the digital scene compared to the maximum distance. That is, within a scene every object has a virtual distance which indicates the distance of that object in virtual space from the user. For example, in an XR environment, each object is represented by vertices and polygons. Each vertex has coordinate information as does the camera, i.e., the user viewing position. In this example, the processor (104) may have a formula to convert virtual world coordinates into meters such that the virtual distance of an object may be compared to the maximum distance. Accordingly, the rendering engine (106) may check the distances of each vertex to the camera position. If any vertex distance is shorter than Dmax, then this polygon may be identified as "near world," meaning it has a virtual distance that is less than the maximum distance and may be rendered stereoscopically, that is it may be rendered twice, once for each eye. If all vertex distance is greater than Dmax, this polygon may be identified as "far world," meaning it has a virtual distance that is greater than the maximum distance and may be rendered as a single image rather than stereoscopically.

In another example, the rendering engine (106) may identify the centroid of the polygon that makes up the object and use the distance from the centroid of the polygon to the camera position to determine whether the polygon is nearer or farther away than the maximum distance.

As used in the present specification and in the appended claims, the term, "rendering engine" refers to various hardware components, which include a processor and memory. The processor includes the circuitry to retrieve executable code from the memory and execute the executable code. As specific examples, the image analysis device as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

As described above, in general stereoscopic rendering, a system processes a digital scene twice, one for the left-eye camera and once for the right-eye camera. The present specification, by comparison, calculates a user and device specific maximum value at which a left eye image and a right eye image are distinguishable. As content beyond that location is indistinguishable between a right eye image and a left eye image, stereoscopic rendering would not provide the intended depth, the present display system (100) selectively renders just the portions of the object that have a virtual distance less than the maximum distance. Meanwhile, all the portions of the digital scene that have a virtual distance greater than the maximum distance may be rendered one time. Compared with existing stereoscopic rendering systems where the entire scene is always rendered twice, the present display system (100) provides a time and processing resource savings.

FIG. 2 is a diagram of a display system (100) for selecting a rendering format based on content virtual distance, according to an example of the principles described herein. In some examples, the display system (100) includes a stereoscopic extended reality headset (208) that is worn by a user (210) 1) to generate visual, auditory, and other sensory environments, 2) to detect user input, and 3) to manipulate the environments based on the user input. While FIG. 2 depicts a particular extended reality headset (208), any type of extended reality headset (208) may be used in accordance with the principles described herein.

The processor (FIG. 1, 104) and the rendering engine (FIG. 1, 106) may be located on/within the extended reality headset (208) or may be positioned on another computing device. In either example, the extended reality headset (208) is communicatively coupled to the processor (FIG. 1, 104) and computer readable program code executable by the processor (FIG. 1, 104) which causes a view of an extended reality environment to be displayed in the extended reality headset (208). In some examples, the extended reality headset (208) may provide stereo sound to the user (210). In an example, the extended reality headset (208) may include a head motion tracking sensor that includes a gyroscope and/or an accelerometer. The extended reality headset (208) may also include an eye tracking sensor to track the eye movement of the user (210).

Figure 3:
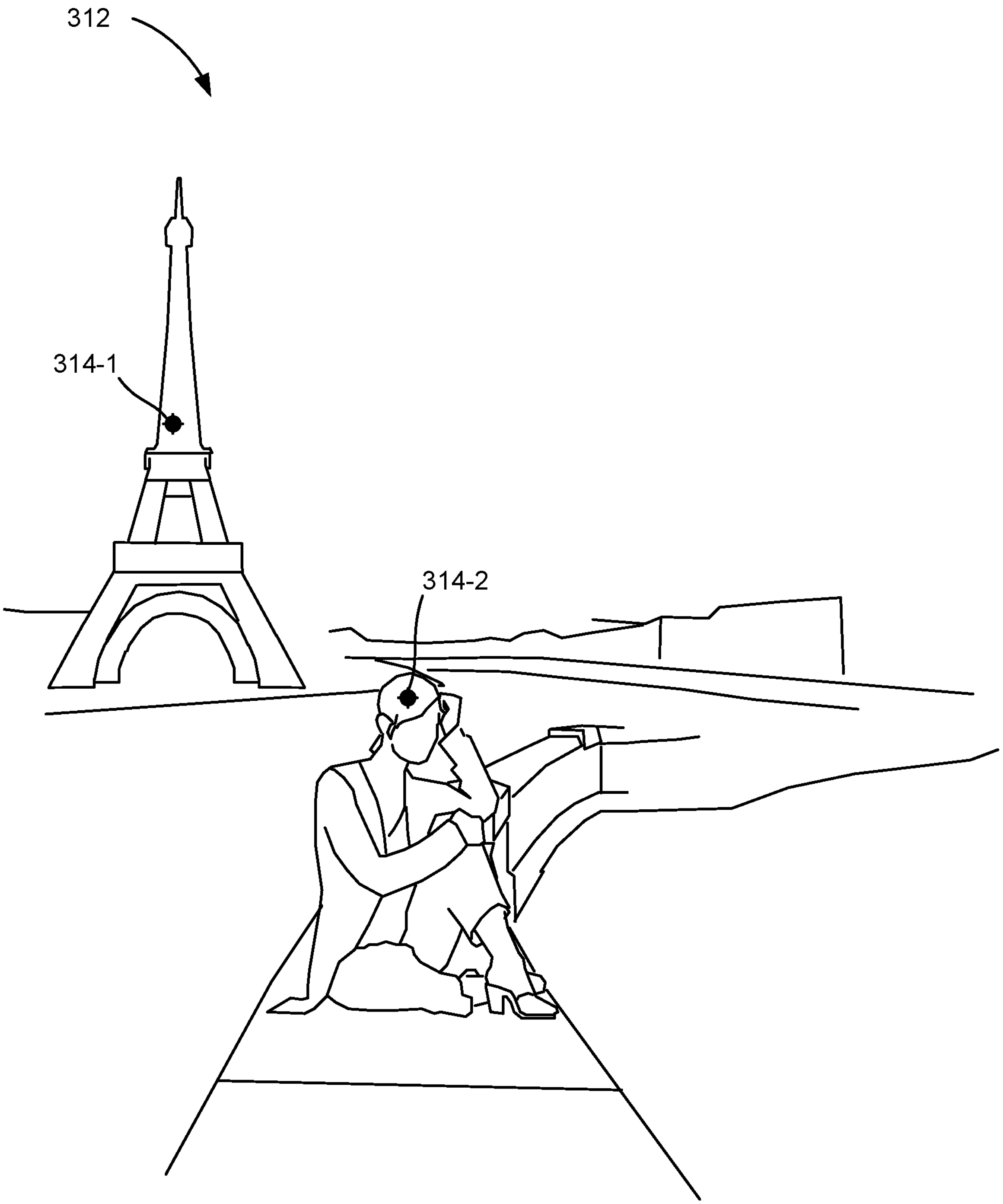
FIG. 3 is a diagram of a digital scene with a rendering format based on content virtual distance, according to an example of the principles described herein.

FIG. 3 is a diagram of a digital scene (312) with a rendering format based on content virtual distance, according to an example of the principles described herein. In this particular example, an individual is sitting on a path in front of the Eiffel Tower in Paris. As described above, the display system (FIG. 1, 100) may determine a maximum distance at which a left eye image and a right eye image are distinguishable for a user (FIG. 2, 210). The rendering engine (FIG. 1, 106) may render portions of the digital scene (312) with virtual distances greater than maximum distance differently than portions of the digital scene (312) with virtual distances less than the maximum distance. Specifically, the rendering engine (FIG. 1, 106) may render portions of the digital scene (312) having a virtual distance greater than the maximum distance as a single eye image, rather than stereoscopically. By comparison, the rendering engine (FIG. 1, 106) renders portions of the digital scene (312) having a virtual distance less than the maximum distance stereoscopically.

As a particular example, it may be determined that 1) the virtual distance of the Eiffel Tower content (314-1) is greater than the maximum distance and 2) the virtual distance of the person content (314-2) is less than the maximum distance. In this example, the Eiffel Tower content (314-1), along with other portions of the digital scene (312) with a virtual distance greater than the maximum distance, is rendered one time. By comparison, the person content (314-1), along with other portions of the digital scene (312) with a virtual distance less than the maximum distance, are rendered two times, one for the left eye and one for the right eye. The left eye rendering and the right eye rendering are then presented to respective eyes via the display device (FIG. 1, 102). As such, less than the entire digital scene (312) is rendered stereoscopically which provides a quicker render rate as a reduced amount of data of the digital scene (312) is processed twice, i.e., stereoscopically.

Figure 4:
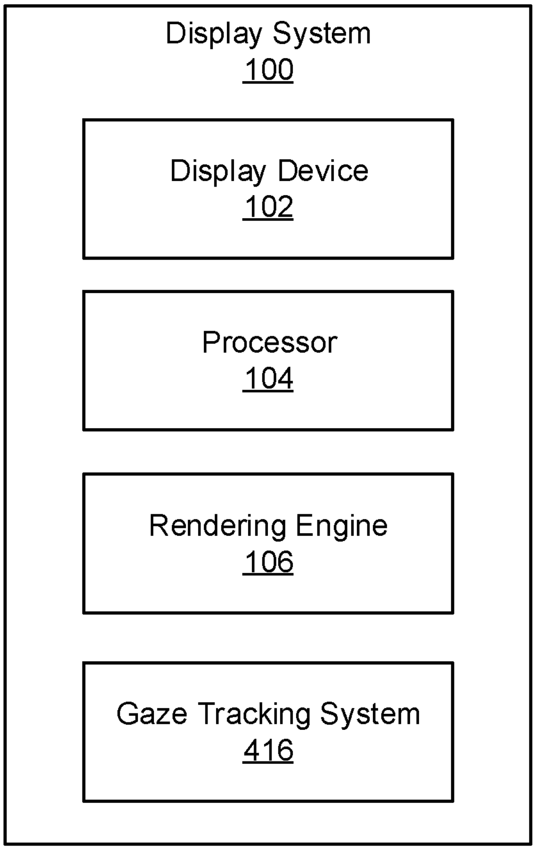
FIG. 4 is a block diagram of a system for selecting a rendering format based on content virtual distance, according to another example of the principles described herein.

FIG. 4 is a block diagram of a display system (100) for selecting a rendering format based on content virtual distance, according to another example of the principles described herein. In the example depicted in FIG. 4, the display system (100) not only determines how to render content based on its virtual distance, but also based on where the user (FIG. 2, 210) is looking, or the user (FIG. 2, 210) gaze direction. Accordingly, the display system (100) includes the display device (102), processor (104), and rendering engine (106) as described above. In this example however, the display system (100) also includes a gaze tracking system (416) to determine a location that the user (FIG. 2, 210) is observing. In this example, the rendering engine (106) selects the rendering format not only based on a virtual distance of the content, but also based on a virtual distance of the location that the user (FIG. 2, 210) is observing.

For example, if the user (FIG. 2, 210) is looking at a portion of the digital scene (FIG. 3, 312) that has a virtual distance greater than the maximum distance, that portion may be rendered stereoscopically. By comparison, if the user (FIG. 2, 210) is looking at a portion of the digital scene (FIG. 3, 312) that has a virtual distance less than the maximum distance, the portion with a virtual distance greater than the maximum distance is rendered as a single eye image. In either example, portions of the digital scene (FIG. 3, 312) that have a virtual distance less than the maximum distance are rendered stereoscopically.

Put another way, portions of the digital scene (FIG. 3, 312) that have a virtual distance less than the maximum distance are rendered stereoscopically while portions of the digital scene (FIG. 3, 312) that have a virtual distance greater than the maximum distance are rendered either 1) stereoscopically or 2) as a single eye image based on whether the user (FIG. 2, 210) is looking at that portion.

Accordingly, the display system (100) includes a gaze tracking system (416) to capture eye movements of a user (FIG. 2, 210) looking at the display device (102). In general, the gaze tracking system (416) is an electronic system that detects and reports at least one user's gaze direction in one or both eyes. The user's gaze direction may refer to the direction of a gaze ray in three-dimensional (3D) space that originates from near or inside the user's eye and indicates the path along which their foveal retina region is pointed. That is, the gaze tracking system (416) determines where a user (FIG. 2, 210) is looking.

In some examples, the gaze tracking system (416) reports the gaze direction relative to the object on which the gaze terminates. For example, the gaze tracking system (416) may determine what part of the display device (102) the user (FIG. 2, 210) is looking at. In extended reality head-mounted displays or other virtual display systems, the gaze ray may be projected into a virtual space that is displayed in front of the user's eye, such that the gaze ray terminates at some virtual point behind the display device (102).

The gaze tracking system (416) may detect the eye's orientation and position in a variety of ways. In one example, the gaze tracking system (416) observes the eye using an infrared or visible light camera. In this example, a light source illuminates the eye causing highly visible reflections, and a camera captures an image of the eye showing these reflections. The image captured by the camera is then used to identify the reflection of the light source on the cornea (glint) and in the pupil.

A processor of the gaze tracking system (416) then calculates a vector formed by the angle between the cornea and pupil reflections. The direction of this vector, combined with other geometrical features of the reflections, is then used to calculate the gaze direction.

The position of the eye anatomy within the camera's image frame can be used to determine where the eye is looking. In some examples, illuminators are used to create reflective glints on the eye's anatomy, and the position of the glints is used to track the eye. In these examples, entire patterns of light can be projected onto the eye, both through diffuse or point illuminators like standard LEDs, collimated LEDs, or low-powered lasers.

Such a display system (100) that determines content rendering based on gaze location provides flexibility and potentially even more time and processing savings. A Display system (100) has a pixel difference threshold which indicates a minimum pixel difference between a left eye image and a right eye image in stereoscopical rendering. Content that has less than the pixel difference threshold can be rendered as a single-eye image. If the threshold pixel difference of the display system (100) is set as 1.0, content with a pixel difference less than 1.0 is skipped to save the computation since the left image content and the right image content are indistinguishable. However, the threshold pixel difference for the display device (102) may be set more aggressively, for example to 3.0 pixels. Doing so alters Dmax. Specifically, by increasing the threshold, Dmax becomes smaller such that more objects are placed into "far world." With more objects in Dmax, rendering may be faster as less content is rendered stereoscopically, but the overall quality of the digital scene (FIG. 3, 312) may be reduced. Accordingly, content in the far world may be rendered stereoscopically such that more depth is perceived when a user (FIG. 2, 210) is observing that portion.

Figure 5:
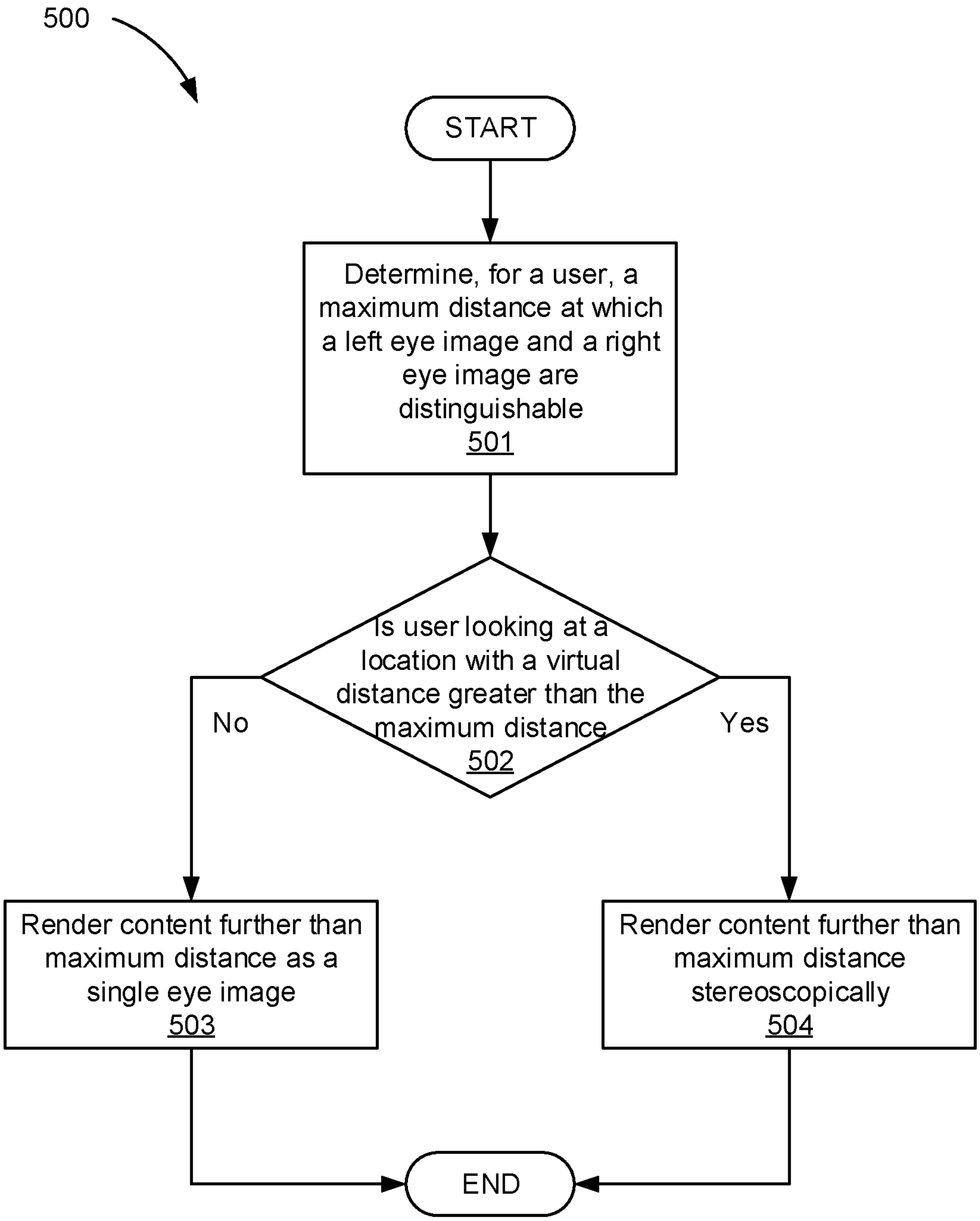
FIG. 5 is a flowchart of a method for selecting a rendering format based on content virtual distance, according to an example of the principles described herein.

FIG. 5 is a flowchart of a method (500) for selecting a rendering format based on content virtual distance, according to an example of the principles described herein. While FIG. 5 depicts particular operations occurring in a particular order. In some examples, operations may be performed in a different order or eliminated in some examples. According to the method (500) a maximum distance at which a left eye image and a right eye image are distinguishable is determined (block 501). As described above, this maximum distance is user (FIG. 2, 210) and device specific. Accordingly, the maximum distance may be determined each time a user (FIG. 2, 210) dons an extended reality headset. In another example, the value may be stored in a database such that when a user (FIG. 2, 210) is identified, for example via facial recognition or input credentials, the maximum distance value is determined (block 501).

The method (500) also includes determining when a user (FIG. 2, 210) is looking at a location in the digital scene (FIG. 3, 312) that has a virtual distance greater than the maximum distance. This may be done via the gaze tracking system (FIG. 4, 416) described above. Responsive to a determination that the user (FIG. 2, 210) is looking at a location in the digital scene (FIG. 3, 312) that has a virtual distance greater than the maximum distance (block 502, determination YES), the far world content, or that content which has a virtual distance greater than the maximum distance, is rendered (block 504) according to a first format, which first format may be stereoscopically.

By comparison, responsive to a determination that the user (FIG. 2, 210) is looking at a location in the digital scene (FIG. 3, 312) that has a virtual distance less than the maximum distance (block 502, determination NO), the far world content, or that content which has a virtual distance greater than the maximum distance, is rendered (block 503) according to a second format, which second format is as a single eye image. Accordingly, the method (500) provides that the display system (FIG. 1, 100) renders far world content stereoscopically when the user (FIG. 2, 210) is looking at it, but renders the far world content as a single eye image when the user (FIG. 2, 210) is not looking at it. By rendering the far world content as a single eye image at times, processing power is decreased and processing speeds are increased as less content is rendered twice. Also, as the far world content is rendered stereoscopically when the user (FIG. 2, 210) is looking at it, the perceived quality of the digital scene (FIG. 3, 312) is maintained.

According to this method (500), when the location that the user (FIG. 2, 210) is observing has a virtual distance that is less than the maximum distance, the rendering engine (FIG. 1, 106) 1) renders the portions that have a virtual distance greater than the maximum distance as a single eye image and 2) renders the portions that have a virtual distance less than the maximum distance stereoscopically. By comparison, when the location that the user (FIG. 2, 210) is observing has a virtual distance that is greater than the maximum distance the rendering engine (FIG. 1, 106) renders the entire digital scene stereoscopically.

Returning to the example depicted in FIG. 3, when the user (FIG. 2, 210) is looking at the person content (FIG. 3, 314-2), the person content (FIG. 3, 314-2), and other near world content, is rendered stereoscopically while the Eiffel Tower content (FIG. 3, 314-2), and other far world content, is rendered as a single eye image. By comparison, when the user (FIG. 2, 210) is looking at the Eiffel Tower content (FIG. 3, 314-1), the person content (FIG. 3, 314-2) and other near world content is rendered stereoscopically and the Eiffel Tower content (FIG. 3, 314-2), and other far world content, is also rendered stereoscopically.

Figure 6:
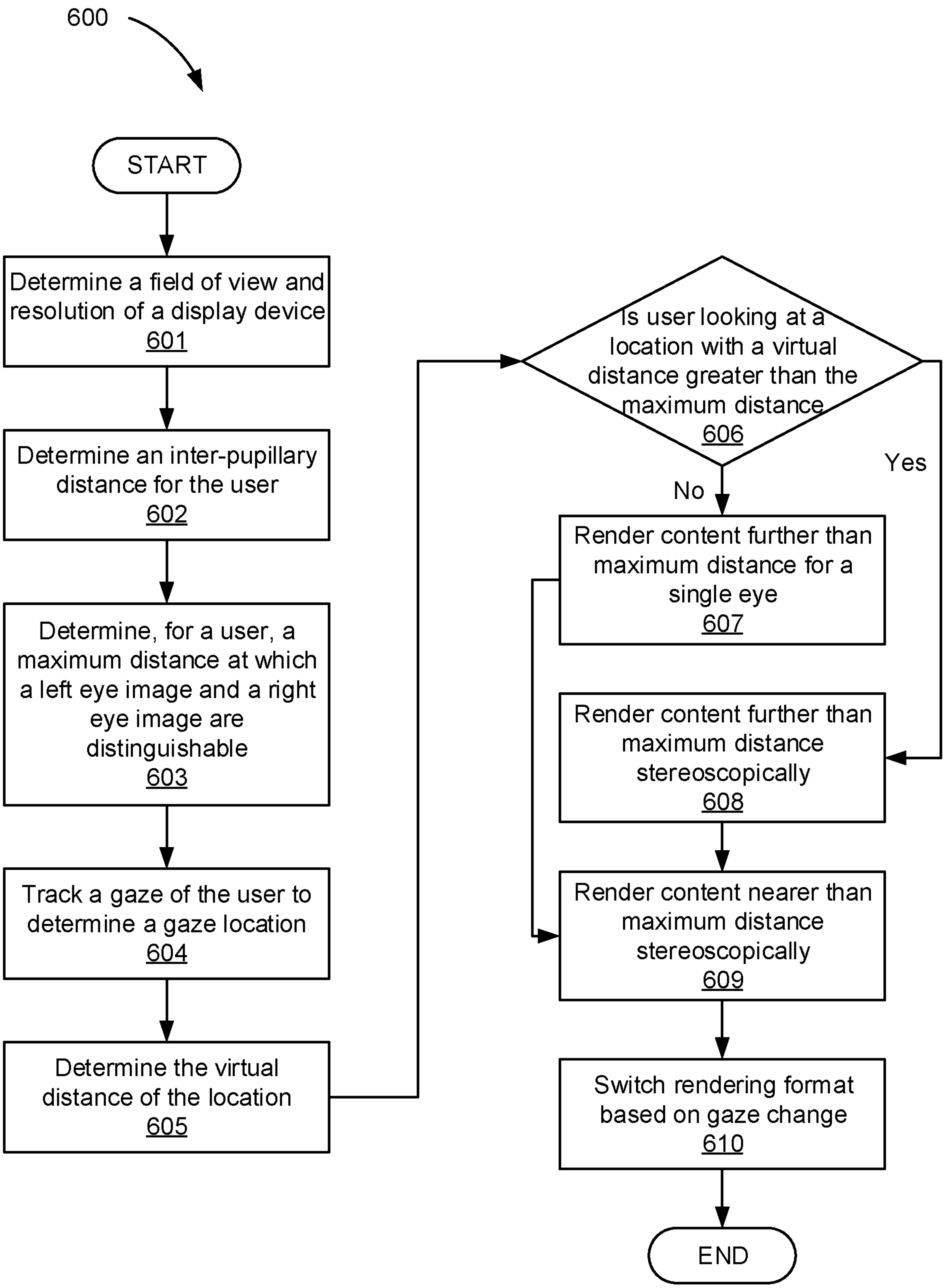
FIG. 6 is a flowchart of a method for selecting a rendering format based on content virtual distance, according to another example of the principles described herein.

FIG. 6 is a flowchart of a method (600) for selecting a rendering format based on content virtual distance, according to another example of the principles described herein. While FIG. 6 depicts particular operations occurring in a particular order. In some examples, operations may be performed in a different order or eliminated in some examples.

As described above, the maximum distance that a user (FIG. 2, 210) can distinguish between a left eye image and a right eye image is determined based on characteristics of the display device (FIG. 1, 102) and characteristics of the user (FIG. 2, 210). Accordingly, the display system (FIG. 1, 100) may determine (block 601) a field of view and a resolution of the display device (FIG. 1, 102) that project the digital scene (FIG. 3, 312). In one particular example, this data may be stored in memory of the display system (FIG. 1, 100) and may be extracted by the processor (FIG. 1, 104).

The method (600) also includes determining (block 602) the inter-pupillary distance for the user (FIG. 2, 210). As described above, this may include receiving input associated with a user (FIG. 2, 210) manually calibrating the display device (FIG. 1, 102). In another example, this data may come from the gaze tracking system (FIG. 4, 416) which has the capability of detecting the pupils of the user (FIG. 2, 210) and calculating a distance between them.

The method (600) also includes determining (block 603) a maximum distance at which a left eye image and a right eye image are distinguishable. This may be performed as described above in connection with FIG. 4, based on the display device (FIG. 1, 102) field of view, resolution and the IPD of the user (FIG. 2, 210).

As described above, in some examples the rendering format for the far world content may be based on whether the user (FIG. 2, 210) is looking at that content. Accordingly, the method (600) includes tracking (block 604) a gaze of the user (FIG. 2, 210) to determine the location they are observing. This may be performed by the gaze tracking system (FIG. 4, 416) described above. Once it is determined where in the digital scene (FIG. 3, 312) the user (FIG. 2, 210) is looking, the processor (FIG. 1, 1040 may determine (block 605) the virtual distance at that location.

As described above, responsive to a determination that the user (FIG. 2, 210) is looking at a location in the digital scene (FIG. 3, 312) that has a virtual distance greater than the maximum distance (block 606, determination YES), the far world content, or that content which has a virtual distance greater than the maximum distance, is rendered (block 608) stereoscopically.

By comparison, responsive to a determination that the user (FIG. 2, 210) is looking at a location in the digital scene (FIG. 3, 312) that has a virtual distance less than the maximum distance (block 606, determination NO), the far world content, or that content which has a virtual distance greater than the maximum distance, is rendered (block 607) is as a single eye image.

In either example, i.e., rendering the far world content stereoscopically or as a single eye image, portions of the digital scene (FIG. 3, 312) that have a virtual distance less than the maximum distance, i.e., near world content, is rendered stereoscopically.

Note that the determination as to how to render the far world content and the rendering thereof is dynamic. That is, as a user (FIG. 2, 210) changes gaze location, the rendering of the far world content may change. Specifically, the method (600) includes switching (block 610) the rendering format based on the user (FIG. 2, 210) changing a gaze location.

Returning to the example depicted in FIG. 3, when the user (FIG. 2, 210) switches from looking at the person content (FIG. 3, 314-2) to looking at the Eiffel Tower content (FIG. 3, 314-1), the Eiffel Tower content (FIG. 3, 314-2), and other far world content, is switched from being rendered as a single eye image to being stereoscopically rendered. Accordingly, the Eiffel Tower content (FIG. 3, 314-2), or other far world content, is rendered stereoscopically when it is being looked at. Otherwise, this far world content is rendered as a single eye image.

Figure 7:
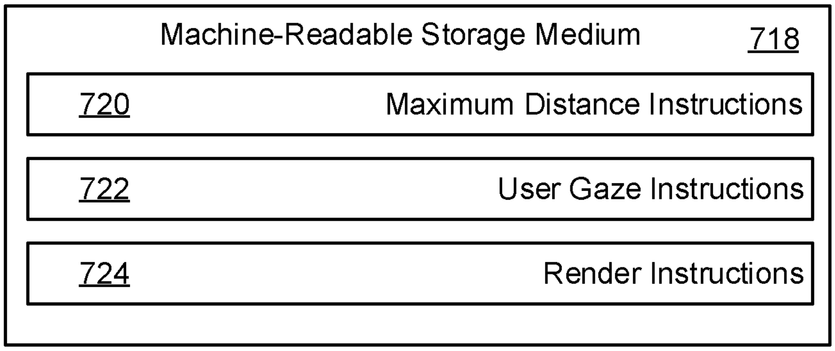
FIG. 7 depicts a non-transitory machine-readable storage medium for selecting a rendering format based on content virtual distance, according to an example of the principles described herein.

FIG. 7 depicts a non-transitory machine-readable storage medium (718) for selecting a rendering format based on content virtual distance, according to an example of the principles described herein. To achieve its desired functionality, the display system (FIG. 1, 100) includes various hardware components. Specifically, the display system (FIG. 1, 100) includes a processor and a machine-readable storage medium (718). The machine-readable storage medium (718) is communicatively coupled to the processor. The machine-readable storage medium (718) includes a number of instructions (720, 722, 724) for performing a designated function. In some examples, the instructions may be machine code and/or script code.

The machine-readable storage medium (718) causes the processor to execute the designated function of the instructions (720, 722, 724). The machine-readable storage medium (718) can store data, programs, instructions, or any other machine-readable data that can be utilized to operate the display system (FIG. 1, 100). Machine-readable storage medium (718) can store machine readable instructions that the processor of the display system (FIG. 1, 100) can process, or execute. The machine-readable storage medium (718) can be an electronic, magnetic, optical, or other physical storage device that contains or stores executable instructions. Machine-readable storage medium (718) may be, for example, Random-Access Memory (RAM), an Electrically Erasable Programmable Read-Only Memory (EEPROM), a storage device, an optical disc, etc. The machine-readable storage medium (718) may be a non-transitory machine-readable storage medium (718).

Referring to FIG. 7, maximum distance instructions (720), when executed by the processor, cause the processor to, determine, for a user (FIG. 2,2 10), a maximum distance at which a left eye image and a right eye image are distinguishable. User gaze instructions (722), when executed by the processor, cause the processor to, determine when the user (FIG. 2, 210) is looking at a location in a digital scene (FIG. 3, 312) that has a virtual distance greater than the maximum distance.

Render instructions (724), when executed by the processor, cause the processor to, render portions of the digital scene (FIG. 3, 312) that have a virtual distance less than the maximum distance stereoscopically. Render instructions (724), when executed by the processor, also cause the processor to, responsive to a determination that the user (FIG. 2, 210) is looking at a location in the digital scene (FIG. 3, 312) that has a virtual distance less than the maximum distance, render portions of the digital scene (FIG. 3, 312) that have a virtual distance greater than the maximum distance as a single eye image. Render instructions (724), when executed by the processor, also cause the processor to, responsive to a determination that the user (FIG. 2, 210) is looking at a location in the digital scene (FIG. 3, 312) that has a virtual distance greater than the maximum distance, render portions of the digital scene (FIG. 3, 312) that have a virtual distance greater than the maximum distance stereoscopically.

In summary, using such a system, method, and machine-readable storage medium may, for example, 1) reduce a workload on a rendering engine of a system; 2) increase the rendering rate; 3) reduce a processing bandwidth; 4) provide a customized rendering based on user specific and display specific information; and 5) maintain the quality of the rendered digital scene. However, it is contemplated that the devices disclosed herein may address other matters and deficiencies in a number of technical areas, for example.

What is claimed is:

1. A display system, comprising:

a display device to display a digital scene, the display device to be worn on a head of a user; and a processor to determine, for the user, a maximum distance at which a difference between a left eye image and a right eye image are distinguishable; and a rendering engine to; select a rendering format for different portions of the digital scene based on (i) a comparison of virtual distances of the portions compared to the maximum distance; and (ii) a virtual distance of an object in the digital scene being observed by the user relative to the maximum distance; and provide the digital scene to the display device for display, wherein the processor is to cause a view of the digital scene to be displayed on the display device as a continuous visual field, wherein the view of the digital scene includes:

a first portion associated with near-world content of the digital scene that has the virtual distance less than the maximum distance; and a second portion associated with far-world content of the digital scene that has the virtual distance greater than the maximum distance;

wherein the near-world content of the first portion of the digital scene is rendered stereoscopically;

wherein the far-world content of the second portion of the digital scene is rendered either:

(a) stereoscopically when the object in the digital scene being observed by the user is included in the first portion of the digital scene; or (b) as a single eye image when the object in the digital scene being observed by the user is included in the second portion of the digital scene; and wherein the display device, the processor, and the rendering engine are included within a housing of the display system.

2. The display system of claim 1, wherein the single eye image is from a perspective of either a left eye of the user or a right eye of the user and the single eye image is presented to both the left eye of the user and the right eye of the user.

3. The display system of claim 1:

further comprising a gaze tracking system to determine a location that the user is observing.

4. The display system of claim 1, wherein the display device is a stereoscopic extended reality headset.

5. The display system of claim 1, wherein:

the processor determines an inter-pupillary distance for the user; and the maximum distance is determined based on the inter-pupillary distance.

6. The display system of claim 1, wherein the display system is an extended reality headset configured to be worn by the user such that the extended reality headset covers the eyes of the user and presents the digital scene in an enclosed environment formed by the extended reality headset and a face of the user.

7. The display system of claim 1, wherein the processor is to:

responsive to the user positioning the display device on the head of the user, identify the user, wherein the user is associated with a predetermined maximum distance, wherein the predetermined maximum distance is a stored maximum distance at which the left eye image and the right eye image are distinguishable for the user, wherein the processor is to determine the maximum distance as the predetermined maximum distance associated with the user responsive to identification of the user.

8. The system of claim 5, wherein the processor determines the inter-pupillary distance for the user based on a manual calibration performed by the user.

9. The system of claim 5, wherein the processor determines the inter-pupillary distance for the user based on information collected from a gaze tracking system, wherein the gaze tracking system is included within the housing.

10. A method, comprising:

determining, with a processor, for a user, a maximum distance at which a left eye image and a right eye image are distinguishable;

determining, with the processor, when the user is looking at a location in a digital scene that has a virtual distance greater than the maximum distance, wherein the digital scene is output via a display device worn by the user, and wherein the display device and the processor are included within a housing;

responsive to a determination that the user is looking at a location in the digital scene that has a virtual distance greater than the maximum distance:

rendering, with the processor, far-world content of the digital scene that has a virtual distance greater than the maximum distance as a single eye image; and displaying, on the display device, the far-world content of the digital scene that has a virtual distance greater than the maximum distance as the single eye image; and responsive to a determination that the user is looking at a location in the digital scene that has a virtual distance less than the maximum distance:

rendering, with the processor, the far-world content of the digital scene that has a virtual distance greater than the maximum distance stereoscopically; and displaying, on the display device, the far-world content of the digital scene that has a virtual distance greater than the maximum distance stereoscopically; and causing a view of a digital scene to be displayed on a display device as a continuous visual field, wherein the view of the digital scene includes near-world content of the digital scene that have the virtual distance less than the maximum distance rendered stereoscopically and the far-world content of the digital scene that have the virtual distance greater than the maximum distance rendered as either the single eye image or stereoscopically based on the virtual distance of the location in the digital scene relative to the maximum distance.

11. The method of claim 10, wherein determining, for the user, the maximum distance at which the left eye image and the right eye image are distinguishable comprises:

determining a field of view and a resolution of the display device that projects the digital scene; and determining an inter-pupillary distance for the user, wherein the maximum distance is determined based on the field of view, the resolution, and the inter-pupillary distance.

12. The method of claim 10, further comprising stereoscopically rendering the near-world content of the digital scene that has a virtual distance less than the maximum distance.

13. The method of claim 10, wherein determining when the user is looking at a location in a digital scene that has a virtual distance greater than the maximum distance comprises:

tracking a gaze of the user to determine the location; and determining the virtual distance of the location.

14. The method of claim 10, further comprising switching the rendering format based on the user changing the location at which the user is looking.

15. A non-transitory machine-readable storage medium encoded with instructions executable by a processor, the machine-readable storage medium comprising instructions to:

determine, for a user, a maximum distance at which a left eye image and a right eye image are distinguishable;

determine when the user is looking at a location in a digital scene that has a virtual distance greater than the maximum distance, wherein the digital scene is provided to the user on a display device worn by the user, and wherein the processor and the display device are included within a housing;

render content of the digital scene that has a virtual distance less than the maximum distance stereoscopically;

display, on the display device, the content of the digital scene that have a virtual distance less than the maximum distance stereoscopically;

responsive to a determination that the user is looking at a location in the digital scene that has a virtual distance greater than the maximum distance:

render content of the digital scene that has a virtual distance greater than the maximum distance stereoscopically; and display, on the display device, the content of the digital scene that has a virtual distance greater than the maximum distance stereoscopically; and responsive to a determination that the user is looking at a location in the digital scene that has a virtual distance less than the maximum distance:

render content of the digital scene that has a virtual distance greater than the maximum distance as a single eye image; and display, on the display device, the content of the digital scene that has a virtual distance greater than the maximum distance as the single eye image; and cause, using the processor, a view of a digital scene to be displayed on the display device as a continuous visual field, wherein the view of the digital scene includes the content of the digital scene that has the virtual distance less than the maximum distance as rendered and the content of the digital scene that has the virtual distance greater than the maximum distance as rendered.

16. The non-transitory machine-readable storage medium of claim 15, wherein the maximum distance is user specific and display specific.

17. The non-transitory machine-readable storage medium of claim 15, wherein stereoscopically rendering comprises generating a left eye image and a right eye image and presenting the images to a corresponding eye.

18. The non-transitory machine-readable storage medium of claim 15, wherein single eye image rendering comprises generating an image from a viewpoint of either a left eye of the user or a right eye of the user and displaying, on the display device, the image to both the left eye of the user and a right eye of the user.

* * * * *